United States Patent [19]
Kanehara et al.

[11] Patent Number: 5,678,403
[45] Date of Patent: Oct. 21, 1997

[54] ADSORPTION APPARATUS FOR UNBURNT HYDROCARBONS FOR INTERNAL COMBUSTION ENGINE

[75] Inventors: Kenji Kanehara, Toyohashi; Jun Yamada, Okazaki; Shingo Morishima, Nukata-gun; Tohru Yoshinaga, Okazaki, all of Japan

[73] Assignee: Nippon Soken, Inc., Nishio, Japan

[21] Appl. No.: 539,529

[22] Filed: Oct. 6, 1995

[30] Foreign Application Priority Data

Oct. 12, 1994 [JP] Japan ................... 6-246207

[51] Int. Cl.$^6$ ........................... F01N 3/02
[52] U.S. Cl. ........................ 60/309; 60/279; 60/311
[58] Field of Search ................ 60/309, 311, 279

[56] References Cited

U.S. PATENT DOCUMENTS 2,612,745 10/1952 Vecchio ........................ 60/309
3,421,315 1/1969 Aoi ............................. 60/309
4,249,375 2/1981 Grundmann ..................... 60/309

FOREIGN PATENT DOCUMENTS 5-231134 9/1993 Japan.

*Primary Examiner*—Douglas Hart
*Attorney, Agent, or Firm*—Cushman, Darby & Cushman Ip Group of Pillsbury Madison & Sutro LLP

[57] ABSTRACT

An adsorption apparatus provided with a means for physically separating and removing moisture, such as a cyclone type separating means or metal honeycomb or other cooling and condensing means, at the upstream side of a hydrocarbon adsorbent so as to enable the hydrocarbons exhausted at the time of engine start-up to be efficiently adsorbed by eliminating the decline in the adsorption power caused by the moisture in the exhaust gas.

8 Claims, 7 Drawing Sheets

ADSORPTION APPARATUS FOR UNBURNT HYDROCARBONS FOR INTERNAL COMBUSTION ENGINE

BACKGROUND OF THE INVENTION

1. Field of the Invention

The present invention relates to a hydrocarbon (HC) adsorption apparatus for temporarily adsorbing the unburnt hydrocarbons, exhausted in relatively large quantities just after start-up of an internal combustion engine, by an adsorbent.

2. Description of the Related Art

There is a system which provides a hydrocarbon adsorbent such as zeolite in the exhaust pipe for temporarily adsorbing the hydrocarbons exhausted without purification at the time of a cold engine start when the catalyst of the exhaust gas purification device is not yet activated. A hydrocarbon adsorbent such as mordenite or zeolite, however, has the defect that the hydrocarbon adsorption power is greatly reduced by the moisture contained in the exhaust gas, as shown in FIG. 2. (In FIG. 2, the vertical axis A shows the amount of hydrocarbon adsorption, while the horizontal axis D shows the concentration of the water vapor. The adsorbent used for the experiment was mordenite. The gas component was a mixture of the hydrocarbon $C_3H_8$ and nitrogen $N_2$.) As a countermeasure for this, it has been considered to provide a moisture absorbent separate from the hydrocarbon adsorbent so as to first adsorb the moisture in the exhaust gas flowing to the hydrocarbon adsorbent. (See Japanese Unexamined Patent Publication (Kokai) No. 5-231134.)

With the method of first passing the exhaust gas of an internal combustion engine flowing toward the hydrocarbon adsorbent through a moisture absorbent so as to cause adsorption and removal of the moisture, however, the flow of the exhaust gas is obstructed not only by the resistance in passage through the moisture absorbent itself, but also by the resistance in passage through the porous separating wall placed at the boundary between the hydrocarbon adsorbent and the moisture adsorbent, so there is problem regarding a rise in engine back pressure and a reduction of output and efficiency.

Furthermore, the moisture adsorbent is constantly exposed to a high temperature exhaust gas during steady engine operation and therefore suffers from a decline in performance caused by heat deterioration, poisoning, and fouling. Therefore, its durability and reliability is questionable. It is difficult to believe that there is actually a practical moisture absorbing material which can maintain stable moisture adsorption performance over a long period.

SUMMARY OF THE INVENTION

The present invention has as its object to provide a novel means for reliably separating and removing the moisture from the exhaust gas flowing into a hydrocarbon adsorbent and thereby enabling the performance of the hydrocarbon adsorbent to be exhibited to a maximum extent without using a problematical means such as a moisture adsorbent, but by using a means which enables the moisture separating and removal action to be maintained stably over a long period without increasing the exhaust resistance of the engine.

The present invention achieves the above object by the provision of an adsorption apparatus provided with a hydrocarbon adsorbent disposed in an exhaust passage of an engine enabling unburnt hydrocarbons exhausted at the time of start-up of the engine to be temporarily adsorbed and a moisture removing means disposed at the upstream side of the hydrocarbon adsorbent for separating and removing the moisture in the exhaust by a physical action.

As shown in FIG. 2, when moisture is adsorbed at the hydrocarbon adsorbent before the adsorption of the hydrocarbons, the amount of hydrocarbons adsorbed drops tremendously. Therefore, it is necessary that moisture adsorbed by the hydrocarbon adsorbent be restrained. In the present invention, provision is made for a physical moisture removing means at the upstream side of the hydrocarbon adsorbent for separation and removal of the moisture. Therefore, no moisture is contained in the exhaust gas flowing to the hydrocarbon adsorbent and the adsorption power of the hydrocarbon adsorbent can be exhibited to its maximum extent.

Normally, if the hydrocarbon adsorbent is positioned at a downstream portion of the exhaust pipe, in a state where the exhaust pipe is cold at engine start-up, the moisture condenses and reaches the hydrocarbon adsorbent in the form of water droplets. Further, if the hydrocarbon adsorbent is positioned at the upstream portion of the exhaust pipe, the moisture reaches the hydrocarbon adsorbent as water vapor. Accordingly, for the moisture reaching the hydrocarbon adsorbent as water droplets, among the methods of physical separation of moisture, the method of causing the exhaust gas to swirl and using the centrifugal force to separate and remove the water droplets from the gas is suitable. Further, for the moisture reaching the hydrocarbon adsorbent as water vapor, among the methods of physical separation of moisture, the method of cooling the exhaust gas by a heat exchanging means to cause the moisture to condense and removing the result is suitable.

By using the means of the present invention, it is possible to effectively separate and remove the moisture reaching the hydrocarbon adsorbent at the time of engine start-up by a physical means in accordance with a position before the hydrocarbon absorbent, so it is possible to reliably prevent a reduction in the performance of the hydrocarbon adsorbent. In addition, the moisture removing means of the present invention will be almost completely free of a decrease in performance due to heat deterioration, poisoning, and fouling even when exposed to high temperature exhaust, such as with a moisture adsorbent, so the moisture removing means can be effective over a long period. In addition, in the present invention, the moisture is separated and removed by a physical separating means such as centrifugal separation or condensation by cooling, so the moisture removing means does not cause a large increase in the exhaust resistance of the engine and therefore there is no concern over causing a reduction in the output and efficiency of the engine.

BRIEF DESCRIPTION OF THE DRAWINGS

These and other objects and features of the present invention will become more apparent from the following description of the preferred embodiments given with reference to the attached drawings, in which.

DESCRIPTION OF THE PREFERRED EMBODIMENTS

Figure 1:
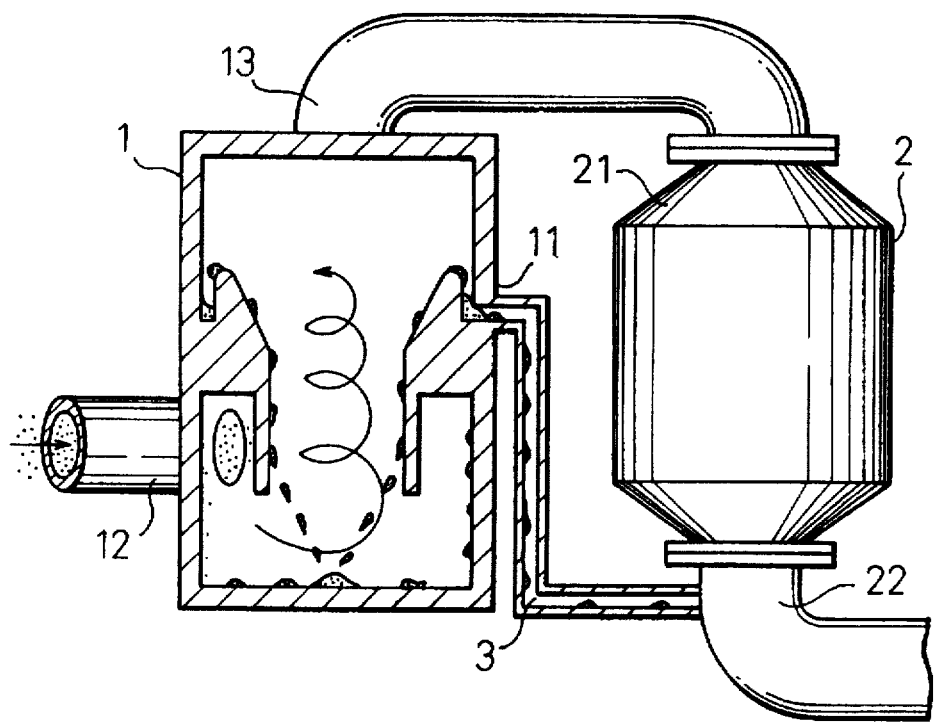
FIG. 1 is a view of the system configuration of a first embodiment of the present invention.
Figure 2:
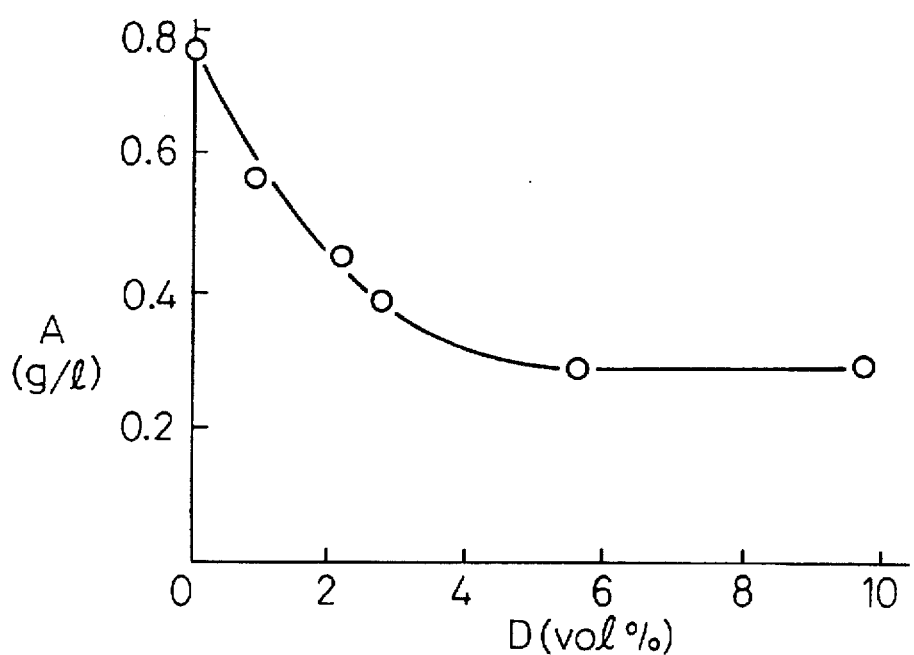
FIG. 2 is a graph of the relationship between the concentration of water vapor in the exhaust gas and the amount of hydrocarbons adsorbed by the adsorbent.

FIG. 1 shows the configuration of a first embodiment of the present invention. The apparatus is comprised by a cyclone type moisture remover 1 forming a vertical cylinder as a whole and having a groove-shaped liquid level cutter 11 along the inside wall surface, an inlet 12 causing the exhaust gas to flow in a tangential direction from the side surface, and an outlet 13 opening to the top, by a not shown zeolite type hydrocarbon adsorbent accommodated in a hollow container 2 forming a vertical cylinder as a whole and disposed with an inlet 21 at the top of an outlet 22, and by a drain pipe 3 connecting the liquid level cutter 11 in the moisture remover 1 and the outlet 22 of the hydrocarbon adsorbent container.

The operation of the apparatus of the first embodiment will be explained below. At the time of engine start-up, the exhaust gas containing the water droplets is introduced into the moisture remover 1 by the inlet 12. The exhaust gas becomes a circular flow as shown by the arrow, rises, and is discharged from the outlet 13. At this time, the water droplets contained in the exhaust gas are separated from the gas by a centrifugal force and are deposited as a film of liquid on the inside wall of the moisture remover 1. This moves upward in the remover 1 due to the swirl of the exhaust gas rising in the moisture remover 1. The water of the liquid film falls into the groove formed in the circumferential wall, that is, the liquid level cutter 11, where it is trapped. The pressure difference caused by pressure loss of the exhaust gas resulting from the hydrocarbon adsorbent being accommodated in the container 2 causes the liquid to pass through the drain pipe 3 from which it is then discharged to the downstream side of the hydrocarbon adsorbent container 2.

The container 2 of the hydrocarbon adsorbent is disposed with the inlet 21 above the outlet 22, so water does not accumulate in the upstream side portion, including the inlet 21, or the container 2. Accordingly, when restarting the engine, there is no concern over moisture accumulating in these portions and flowing into the adsorbent in large quantities causing a reduction of the adsorption power.

Due to the above operation, it is possible to efficiently remove the moisture in exhaust gas and to improve the power of the hydrocarbon adsorbent accommodated in the container 2.

Figure 3:
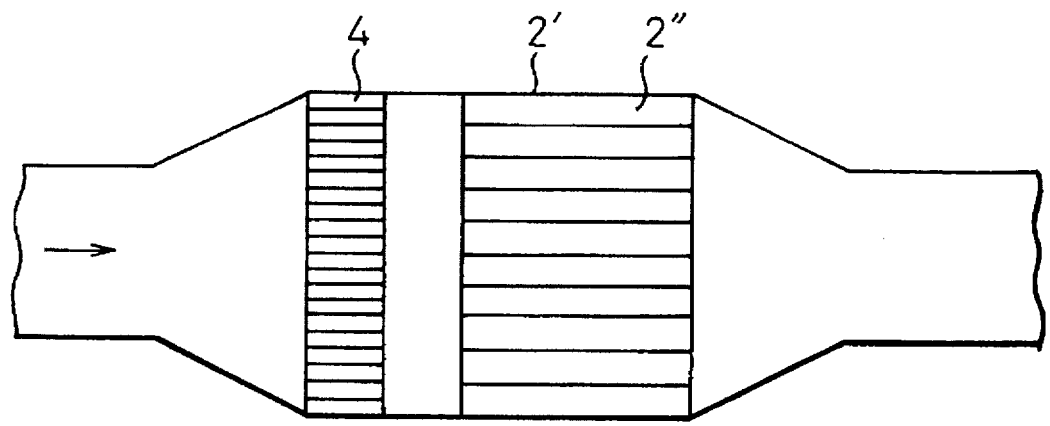
FIG. 3 is a cross-sectional view of key portions of a second embodiment.
Figure 4:
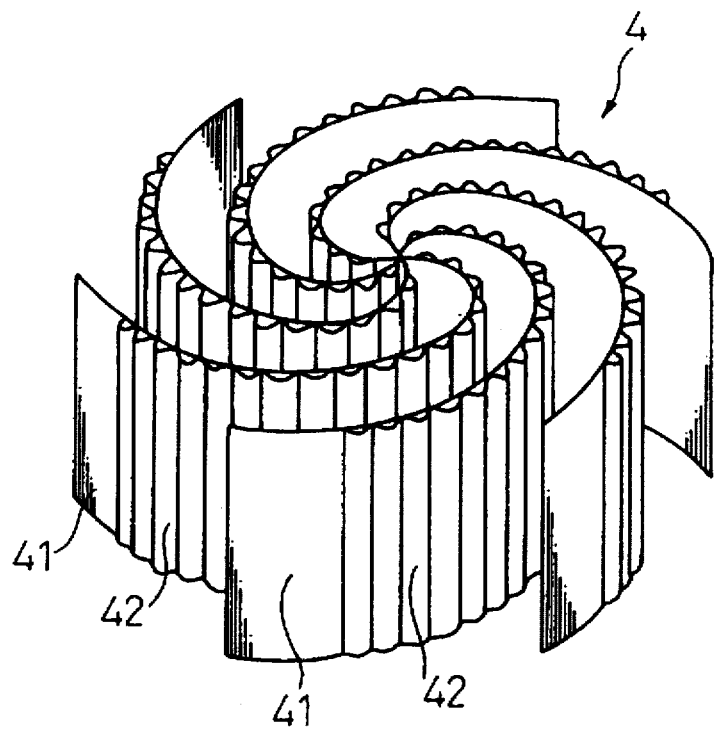
FIG. 4 is a perspective view of a metal honeycomb in the second embodiment.

FIG. 3 shows a second embodiment of the present invention. In this embodiment, a metal honeycomb 4, is present as a moisture remover and is comprised of a metal such as stainless steel foil of a thickness of 50 microns or so, in the exhaust gas passage at the upstream side of the hydrocarbon adsorbent 2" accommodated in the hollow container 2'. The metal honeycomb 4, as shown in FIG. 4, is formed by alternately superposing a flat sheet 41 and corrugated sheet 42 and wrapping them in a spiral manner.

Figure 5:
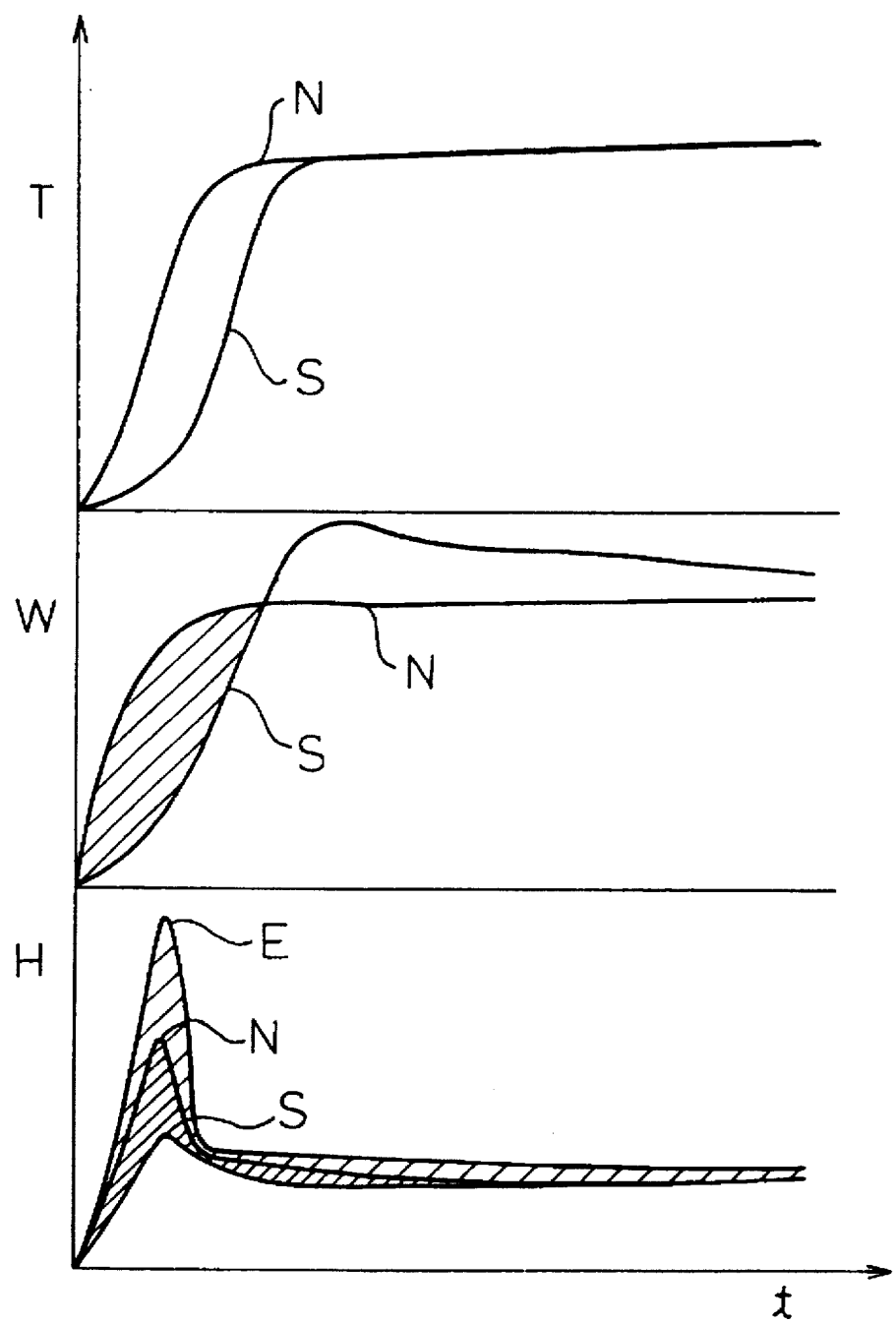
FIG. 5 is a graph of the mode of operation of the second embodiment.

The operation of this embodiment will be explained next using the graph of FIG. 5. In FIG. 5, the horizontal axis represents the time t. The top vertical axis T represents the level of the temperature of the gas flowing into the adsorbent, the middle vertical axis W represents the amount of the moisture in the exhaust gas, and the bottom vertical axis H represents the amount of the hydrocarbons discharged. The curves S of each portion indicate the use of the metal honeycomb 4, while the curves N indicate that the metal honeycomb 4 was not used. Note that the curve E at the bottom portion shows the amount of hydrocarbons in the gas flowing into the system. The temperature of the exhaust gas flowing into the metal honeycomb 4 at the time of engine startup rapidly falls when the gas comes into contact with the surface of the metal honeycomb 4 due to the fact that the temperature of the metal honeycomb 4 is far lower than the temperature of the exhaust gas and the fact that the metal honeycomb 4 has a good heat transmission or heat conductivity. At this time, the amount of the water vapor in the exhaust gas is about 12 percent by volume when the temperature of the exhaust gas is over 50° C. (assuming the fuel is completely oxidized to $CO_2$ and $H_2O$) and the saturated water vapor concentration at each temperature when less than 50° C. Therefore, the amount of the decline in the concentration of the water vapor in the exhaust gas, corresponding to the regions shown by the hatching in FIG. 5, is condensed water which is trapped on the surface of the metal honeycomb 4, so the amount of moisture in the exhaust gas reaching the adsorbent 2" is remarkably reduced.

As a result, the adsorption power of the adsorbent 2" with respect to the hydrocarbons discharged immediately after the start of the engine is improved and, as shown in FIG. 5, the amount of the hydrocarbons discharged directly after start-up can be reduced. The moisture trapped on the cells is evaporated and discharged along with the rise in the temperature of the exhaust gas, so no special means is required for its removal.

Figure 6:
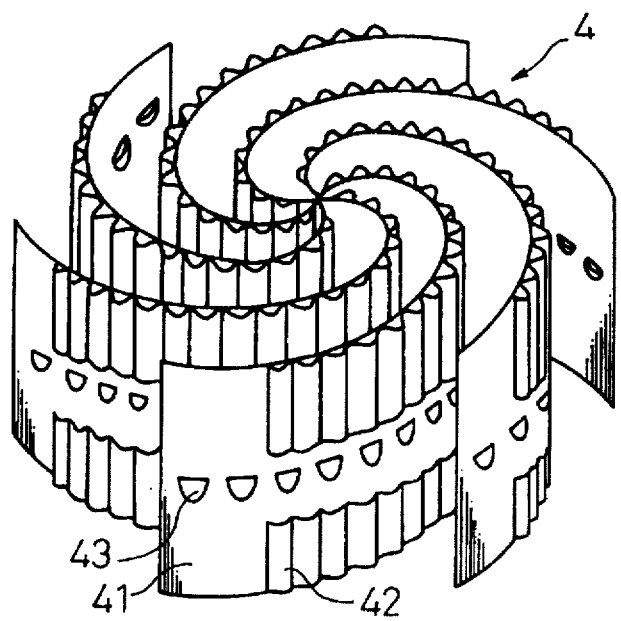
FIG. 6 is a perspective view of a metal honeycomb in the third embodiment.
Figure 7:
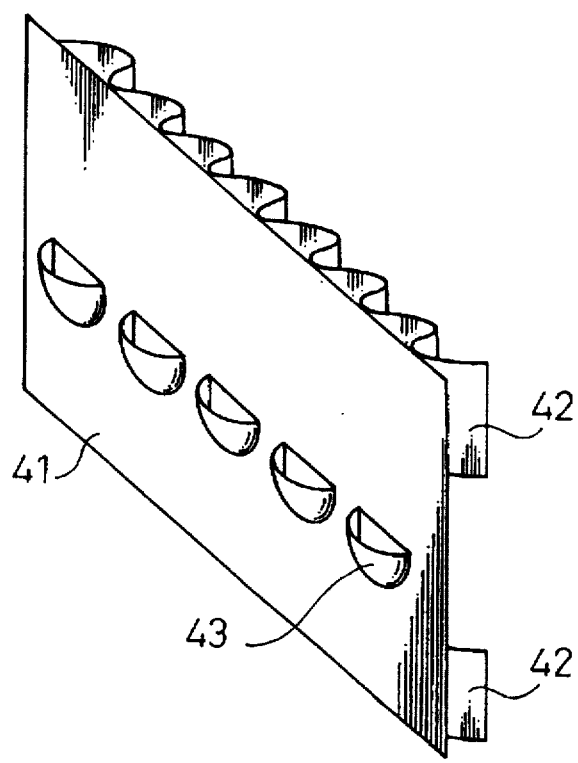
FIG. 7 is a perspective view of the detailed construction of a metal honeycomb in the third embodiment.

FIG. 6 shows a third embodiment of the present invention. This embodiment is a modification of the metal honeycomb 4 of the second embodiment and is characterized, as shown in FIG. 7, by the removal of part of the corrugated sheet and by cutting and raising in semicircles those parts of the flat sheet 4 corresponding to the locations where the corrugated sheets 42 have been removed to thereby form louvers 43.

Figure 8:
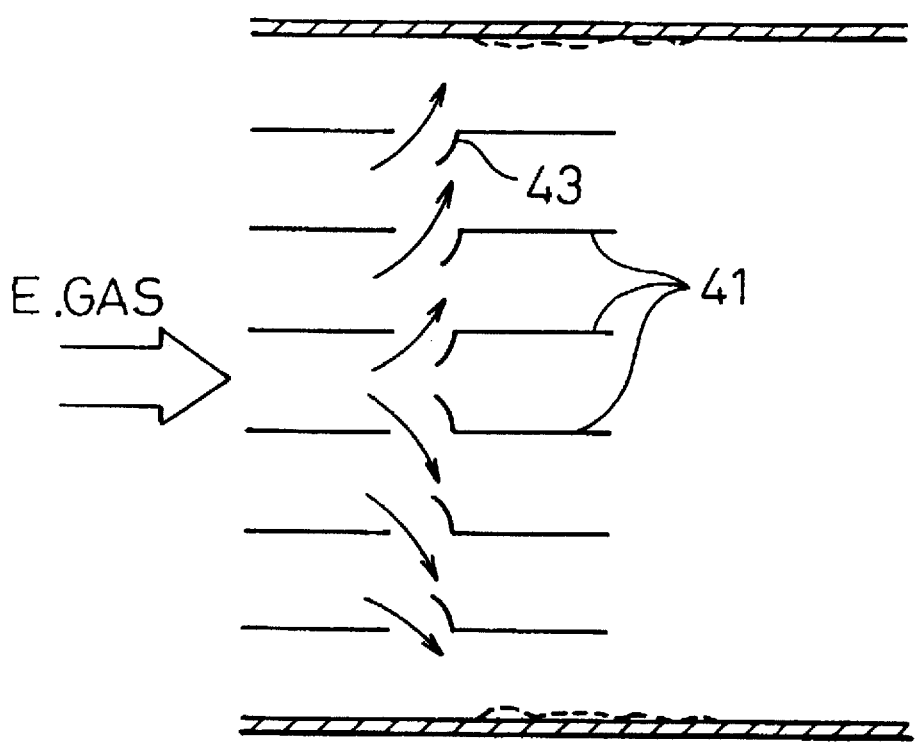
FIG. 8 is a schematic view of the mode of operation of the third embodiment.

According to this embodiment, as shown in FIG. 8, the exhaust flowing into the system, as shown by the arrows, is changed in the direction of flow by the louvers 43 and is dispersed in the direction of the walls of the apparatus, such that the cooling effect of the walls on the exhaust and the condensing efficiency of the moisture in the exhaust can be improved.

Figure 9:
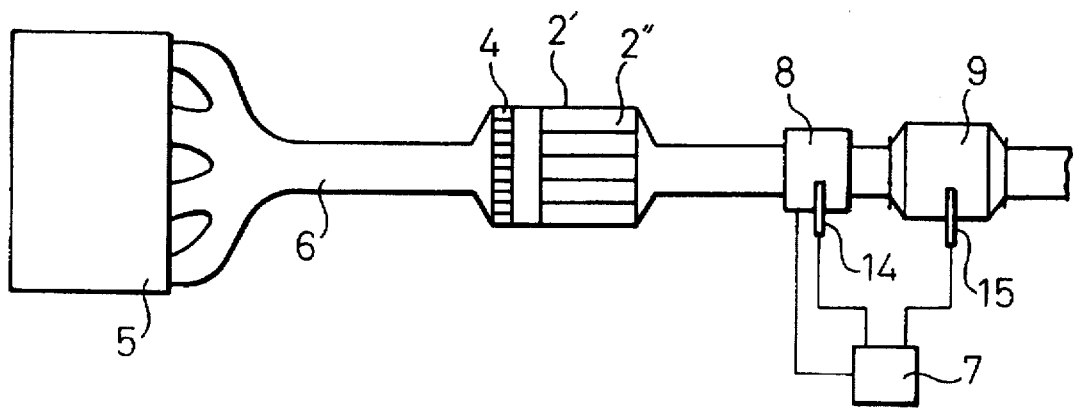
FIG. 9 is a view of the system configuration of the fourth embodiment.

Below, as a fourth embodiment and fifth embodiment, an explanation will be made of applications of the metal honeycombs explained in the second embodiment and third embodiment to an exhaust gas purification system. FIG. 9 shows the fourth embodiment of the present invention. This embodiment shows application to a system, usually called an "in-line system", in which the adsorbent and the catalyst are arranged in series. The configuration and the operation of the system will be explained below. Inside the exhaust passage 6 of the engine 5, a metal honeycomb 4, adsorbent 2", hydrocarbons catalyst equipped with an electrical heating means (EHC) 8, and catalytic converter 9 are disposed in series from the upstream side. Further, the temperatures inside the EHC 8 and the catalytic converter 9 are measured by the temperature sensors 14 and 15. The temperature data is sent to the control unit 7.

Figure 10:
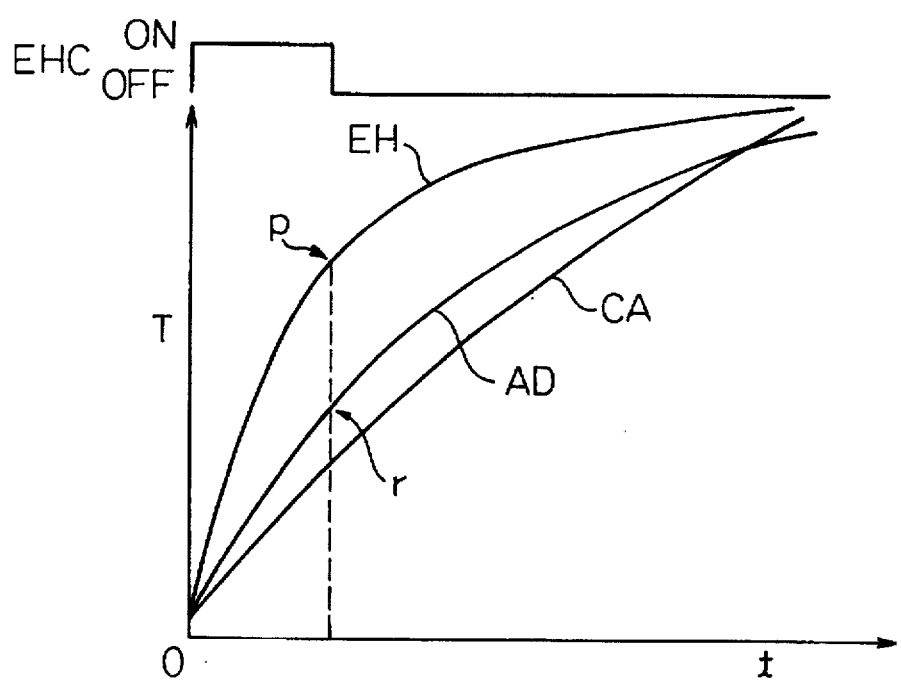
FIG. 10 is a graph of the mode of operation of the fourth embodiment.

The operation of the system of the fourth embodiment will be explained next. The exhaust gas exhausted from the engine 5 at the time of a cold start and containing water vapor and unburnt hydrocarbons passes through the metal honeycomb 4, at which time the cooling effect of the honeycomb 4 causes the moisture to condense and be trapped on the honeycomb cells, so the concentration of water vapor in the exhaust is reduced and the hydrocarbons are efficiently adsorbed by the adsorbent 2". Further, the EHC 8 is powered at the same time the engine is started. Power continues to be supplied through the control unit 7 for heating until the catalytic converter 9 disposed at its downstream side reaches the purification temperature or the inside of the EHC 8 reaches the purification temperature. Therefore, when the adsorbent 2" starts to desorb the hydrocarbons, the EHC 8 is warmed and the amount of the hydrocarbons discharged can be reduced. Also, at the time when the catalytic converter 9 is warm, for example, at the time of engine restart, the EHC 8 is not powered. The changes in temperature during this time are shown in FIG. 10. In FIG. 10, the vertical axis T shows the temperature and the horizontal axis t the time. The curve EH shows the changes along with time of the temperature in the EHC 8. The curve AD shows the changes of the temperature in the adsorbent, and the curve CA the temperature inside the catalytic converter 9. The top portion of FIG. 10 shows the ON-OFF state of the EHC 8. The point p at the time when the EHC 8 is switched from ON to OFF corresponds to the purification temperature, while the point r corresponds to the hydrocarbon desorption temperature.

Figure 11:
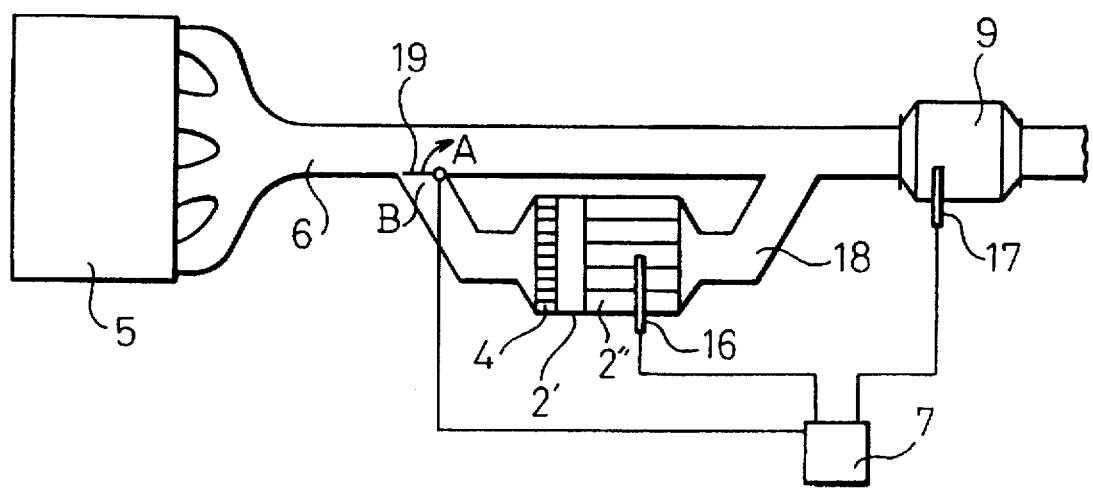
FIG. 11 is a view of the system configuration of a fifth embodiment.

FIG. 11 shows the fifth embodiment of the present invention. The exhaust passage 6 of the engine 5 is divided into a bypass 18 side which passes from the upstream side through the metal honeycomb 4 and adsorbent 2" by switching by a valve 19 and a main passage leading straight to the catalytic converter 9. Temperature sensors 16 and 17 are provided at the adsorbent 2" and the catalytic converter 9. The temperature data detected by these is sent to the control unit 7.

The operation of the system of the fifth embodiment will be explained next. In the case of the valve 19, the valve position allowing the exhaust gas to pass through the bypass 18 side is on the A-side and the valve position at the time when the exhaust gas passes through the main passage is on the B-side. At the time of a cold start-up of the engine 5, the valve 19 is at the A-side. The exhaust gas containing water vapor and unburnt hydrocarbons exhausted from the engine 5 is reduced in the concentration of the water vapor since the moisture is condensed and trapped on the honeycomb 4 by the cooling effect of the honeycomb 4 and therefore the hydrocarbons are efficiently adsorbed by the adsorbent 2".

Figure 12:
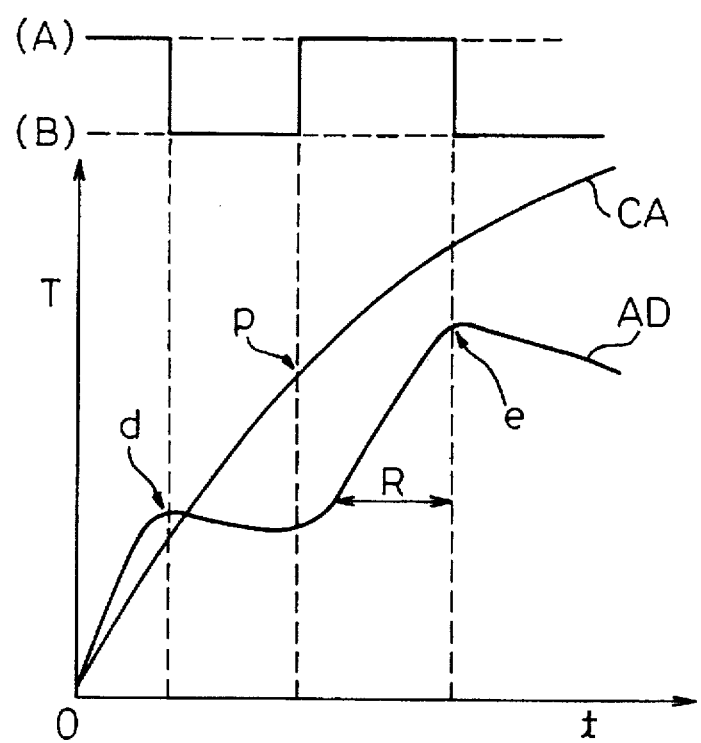
FIG. 12 is a graph of the mode of operation of the fifth embodiment.

Further, the adsorbent 2" is heated by the exhaust gas and rises in temperature. When it reaches the desorption temperature of the hydrocarbons, the valve is switched to the B-side by the control unit 7. As a result, the exhaust of hydrocarbons is suppressed and, at the same time, the catalytic converter 9 is warmed by the exhaust gas. When the catalytic converter 9 reaches the purification temperature, the valve 19 is switched to the A-side, whereupon the exhaust gas flows through the bypass passage 18 side. Therefore, the adsorbent 2" rises is temperature due to the exhaust gas and the hydrocarbons starts to be desorbed from the adsorbent 2" The desorbed hydrocarbons are purified by the downstream catalytic converter 9. The end of the desorption of the hydrocarbons is judged by the temperature of the adsorbent 2", whereupon the control unit 7 switches the valve 19 to the B-side. Due to this, an excessive rise in temperature of the adsorbent 2" is prevented and deterioration of the performance of the adsorbent" is suppressed. The changes in temperature at different portion during this time are shown in FIG. 12. The horizontal axis t of FIG. 12 represents the time, while the vertical axis T shows the temperature. The top portion of FIG. 12 corresponds to the opening and closing states of the valve 19. A top level shows when the valve 19 is at the A-side, while a bottom level shows when it is at the B-side. In FIG. 12, the curve CA shows the changes along with time in the temperature in the catalyst, while the curve AD shows the changes in time of the temperature in the adsorbent. From the relation with the opening and closing of the valve 19, the point d corresponds to the hydrocarbon desorption temperature, the point p the purification temperature, and the point e the hydrocarbon desorption end temperature. The range R shown by the arrows shows the hydrocarbon desorption.

We claim:

1. An adsorption apparatus comprising:
   an adsorbent disposed in an exhaust passage of an internal combustion engine, the adsorbent temporarily adsorbing and holding unburnt hydrocarbons exhausted at a time of startup of the internal combustion engine;
   moisture removing means for physically separating and removing moisture in an exhaust gas at an upstream side of the adsorbent and a downstream side of the internal combustion engine, wherein
   the moisture removing means is comprised of a metal honeycomb formed by alternately superposing at least one flat sheet and at least one corrugated sheet and forming a plurality of passages for passing of the exhaust gas between the at least one corrugated sheet and the at least one flat sheet.

2. The adsorption apparatus as set forth in claim 1, wherein the moisture removing means cools the exhaust gas by a cooling surface comprised of the metal honeycomb, so as to trap the moisture which is separated and condensed on the cooling surface.

3. The adsorption apparatus as set forth in claim 1, wherein the metal honeycomb is formed to have a plurality of holes on the at least one flat sheet communicating the plurality of passages with an external portion of the metal honeycomb.

4. The adsorption apparatus as set forth in claim 1, wherein the metal honeycomb is formed by alternately superposing at least one flat sheet and at least one corrugated sheet and wrapping them in a spiral manner.

5. The adsorption apparatus as set forth in claim 3, wherein the holes are formed by cutting and raising parts of the at least one flat sheet.

6. The adsorption apparatus as set forth in claim 5, further comprising a louver is disposed around each one of the holes.

7. An adsorption apparatus comprising:
   an adsorbent disposed in an exhaust passage of an internal combustion engine and causing unburnt hydrocarbons exhausted at a time of startup of the internal combustion engine to be temporarily adsorbed by the adsorbent to hold the unburnt hydrocarbons; and moisture removing means for physically separating and removing moisture in an exhaust gas at an upstream side of the absorbent and a downstream side of the internal combustion engine, wherein the moisture removing means cools the exhaust gas by a cooling surface so as to trap the moisture which is separated and condensed on the cooling surface, and the cooling surface is comprised of a metal honeycomb.

8. An adsorption apparatus comprising:

an adsorbent disposed in an exhaust passage of an internal combustion engine and causing unburnt hydrocarbons exhausted at a time of startup of the internal combustion engine to be temporarily adsorbed by the adsorbent to hold the unburnt hydrocarbons; and moisture removing means for physically separating and removing moisture in an exhaust gas at an upstream side of the absorbent and a downstream side of the internal combustion engine, wherein the moisture removing means includes a metal honeycomb.

* * * * *